United States Patent [19]

Lo

[11] Patent Number: 4,845,175

[45] Date of Patent: Jul. 4, 1989

[54] PREPARATION OF AQUEOUS POLYMER EMULSIONS IN THE PRESENCE OF HYDROPHOBICALLY MODIFIED HYDROXYETHYLCELLULOSE

[75] Inventor: Chia-Chen Lo, Raleigh, N.C.

[73] Assignee: Union Carbide Corporation, Danbury, Conn.

[21] Appl. No.: 172,432

[22] Filed: Mar. 24, 1988

[51] Int. Cl.⁴ .................... C08F 2/00; C08F 120/18
[52] U.S. Cl. ................................. 526/200; 526/329.7
[58] Field of Search ........................... 526/200, 329.7

[56] References Cited

U.S. PATENT DOCUMENTS

| | | | |
|---|---|---|---|
| 4,228,277 | 10/1980 | Landoll | 536/90 |
| 4,352,916 | 10/1984 | Landoll | 526/200 |
| 4,684,704 | 8/1987 | Craig | 526/200 |

OTHER PUBLICATIONS

Polymeric Surfactants based on Hydroxyethyl Cellulose as Stabilizers in Emulsion Polymerization, D. H. Craig, ACS Polymeric Materials Science and Engineering, vol. 54, Spring 1986, pp. 354–357.

Primary Examiner—Joseph L. Schofer
Assistant Examiner—N. Sarofin
Attorney, Agent, or Firm—Eugene C. Trautlein

[57] ABSTRACT

Disclosed is an improved process for the emulsion polymerization of ethylenically unsaturated monomers in the presence of a polymerization is conducted in the presence of from about 0.02 to about 2.0 percent by weight of the total monomer content, of a hydrophobically modified hydroxyethylcellulose.

10 Claims, No Drawings

PREPARATION OF AQUEOUS POLYMER EMULSIONS IN THE PRESENCE OF HYDROPHOBICALLY MODIFIED HYDROXYETHYLCELLULOSE

In the commercial production of an aqueous polymer emulsion, or latex, of vinyl monomers, water soluble polymers are used as protective colloids in order to improve the rheological and stability characteristics of the emulsion. Such emulsions are widely utilized in various applications including paints, binders, inks, paper, textiles, adhesives, floor polishes, and the like.

Aqueous polymer emulsions are prepared by emulsion polymerization of vinyl monomers in the presence of stabilizers. The stability of the aqueous polymer emulsions is critically important during the polymerization reaction. Unstable polymer emulsions during polymerization will result in high grit or coagulum in the final products. When this occurs, not only is there a certain amount of polymer loss, but the time and effort required in cleaning and filtering operations are an additional processing expense.

Aqueous polymer emulsions used in certain applications, such as in a latex paint, require inclusion with the polymer emulsion of various ingredients such as fillers and extenders, pigments, pH control agents, viscosity control agents, bactericides, antifoams, and the like. For a paint to develop its optimum strength, the polymer emulsion particles must be well dispersed in the formulation so that the maximum polymer surface area is available to bind the mass together. If a polymer emulsion coagulates or agglomerates during the mixing of the formulation, the strength properties of the final paint will be poor. The polymer emulsion therefore must be colloidally stable to all of the other ingredients in the paint formulation as well as to the mixing and other mechanical stresses involved in the production of the paint.

The stability of aqueous polymer emulsions is obtained largely from the type of stabilizer system used in the manufacture of the polymer emulsion. Generally, the stabilizer system is introduced during the polymerization. Water-soluble polymers function as stabilizers for the preparation of aqueous polymer emulsions during the polymerization and are normally called protective colloids. A major class of protective colloid for use with vinyl monomers is cellulose ethers, in particular hydroxyethylcellulose (HEC), which can be characterized as a nonionic stabilizer anchored to the polymer emulsion particle.

In the emulsion polymerization of ethylenically unsaturated monomers, the presence of an effective amount of HEC is known to produce latexes of submicron particle size having improved stability and performance. Although hydroxyethylcellulose is widely used as the protective colloid to make polymer emulsions, it does feature certain deficiencies. A high level of hydroxyethylcellulose normally is needed in order to prevent agglomeration of the emulsion during polymerization and to maintain mechanical stability against shear force during the mixing of polymer emulsion with paint ingredients. Typically, for effective use as a protective colloid for vinyl monomers, HEC is employed in a proportion ranging from about one percent or more by weight of the total monomer content. A dried film of polymer emulsion containing this high level of hydroxyethylcellulose, however, becomes water sensitive. This increased water sensitivity of polymer emulsion results in a paint film less resistant to weathering and/or washing to remove soil. Accordingly, there is a need for an efficient water-soluble polymer as a protective colloid that can be employed at low use levels in the preparation of aqueous polymer emulsions.

In water-soluble polymers modified with hydrophobic groups, the hydrophobic groups associated with each other in the aqueous phase. A network is formed due to this kind of association and renders these polymers as efficient thickeners for aqueous paint systems. The hydrophilic backbone and hydrophobic side groups also make the polymers exhibit surface activity. These hydrophobically modified water-soluble polymers are categorized as associated thickeners. A number of associative thickeners are available commercially. For example, hhydroxyethylcellulose has been modified with open chain alkyl groups and is used as an associative thickener as described in U.S. Pat. No. 4,228,227. This reference describes an open chain $C_{10}$ to $C_{24}$ alkyl epoxide, in an amount between 0.2 to 1%, reacted with hydroxyethylcellulose to prepare a hydrophobically modified hydroxyethylcellulose.

The utilization of an alkyl modified hydroxyethylcellulose for stabilization of vinyl polymers in suspension polymerization is described in U.S. Pat. No. 4,352,916. However, the average size of the polymer particle prepared by suspension polymerization is between 85 to 2300 microns, which is too large for use in surface coating applications.

It has now been discovered, according to the present invention, that hydrophobically modified hydroxyethylcelluloses (HMHEC) function as an effective protective colloid for the preparation of aqueous polymer emulsions of vinyl monomers. Further, it has been found that such hydrophobically modified cellulose ethers function as effective protective colloids at levels significantly lower than levels required when utilizing standard HEC.

The hydrophobically modified hydroxyethylcelluloses useful in this invention include alkyl modified hydroxyethylcellulose and aryl alkyl modified hydroxyethylcellulose. The HEC backbone modified with the hydrophobic hydrocarbon group can be any hydroxyethylcellulose. The alkyl modified hydroxyethylcellulose is a hydroxyethylcellulose further reacted with an open chain hydrocarbon containing molecule. The long chain alkyl group can be attached to a hydroxyethylcellulose by an ether, ester or urethane linkage. An alkyl modified cellulose ether useful in the process of the present invention is a hydroxyethylcellulose modified with a hydrocarbon group having from about 8 to about 25 carbon atoms, preferably from about 8 to 20 carbon atoms. Generally, the hydroxyethylcellulose is modified with a small amount of hydrocarbon group ranging from about 0.1 to about 2.0 weight percent, preferably from about 0.4 to about 0.9 weight percent, based on the total weight of HMHEC. For example, U.S. Pat. No. 4,228,277 describes a hydroxyethylcellulose which is modified with a $C_{10}$ to $C_{24}$ alkyl epoxide in an amount between 0.2 to 1%; this HMHEC is marketed under the trademark of Natrosol Plus by Hercules, Inc. Aryl alkyl modified hydroxyethylcelluloses useful in this invention include hydroxyethylcellulose modified with an aryl alkyl group having a $C_1$ to $C_{25}$ alkyl group attached to a benzene or naphthalene ring. The degree of substitution of aryl alkyl group is generally from about 0.001 to about 0.025, preferably from about 0.002 to about 0.02.

Pursuant to the present invention, the HMHEC protective colloid preferably is utilized in an amount ranging from about 0.02 to about 2.0 percent by weight, based on the weight of total monomer. Most preferably, the HMHEC is used in an amount ranging from about 0.05 to about 1.0 percent. Such amounts incorporated into aqueous polymer emulsions have been found to produce latexes featuring particle sizes of less than 1.0 micron having favorable stability characteristics.

In general, any ethylenically unsaturated monomer may be used in the emulsion polymerization process of the present invention. Such suitable vinyl monomers include monomers, which have high reactivity towards hydroxyethylcellulose (sometimes referred to as "high protective colloid-grafting potential monomers") as well as the monomers which have low reactivity towards HEC (sometimes referred to as "low protective colloid-grafting potential monomers"), mixtures thereof, and the like. Typical monomers having high reactivity towards HEC are acrylic monomers including acrylic acid and esters and methacrylic acid and esters such as: acrylic acid, methacrylic acid, n-butyl acrylate, isobutyl acrylate, ethyl acrylate, methyl acrylate, 2-ethylhexyl acrylate, oleyl acrylate, dodecyl acrylate, stearyl acrylate, methylmethacrylate, ethyl methacrylate, n-butyl methacrylate, mixtures thereof, and the like.

Vinyl monomers which have low reactivity toward hydroxyethylcellulose, or monomers which have low protective colloid-grafting potential, also are suitable for the present invention. Such monomers include: vinyl esters, for example vinyl acetate, vinyl propionate, vinyl formate, vinyl n-butyrate, vinyl laurate, vinyl versatate, vinyl stearate, vinyl privalate, and the like; vinyl ethers, for example, methylvinyl ether, ethylvinyl ether, and butylvinyl ether; allyl monomers, for example allyl acetate, allyl propionate, allyl lactate, allyl amines, and the like; olefins, such as ethylene, propylene, 1-butene, 1-pentene, 1-hexene, and the like.

Other vinyl monomers suitable for this invention include: acrylonitrile, styrene, p-methyl styrene, vinyl and vinylidene halides such as vinyl chloride and vinylidene chloride, sodium vinyl sulfonate, acrylamide, methacrylamide, sodium 2-acrylamide-2-methyl-propane sulfonate (AMPS), diacetone acrylamide, N-methylol acrylamide, N-methylol methacrylamide, maleic acid, fumeric acid, itaconic acid, dimethyl maleate, di-n-butyl maleate, diethyl maleate, diethylhexyl maleate, diethyl fumarate, butadiene, chloroprene, isoprene, 1,4-butanediol dimethacrylate, diallyl maleate, divinyl adipate, pentaerythritol triacrylate, crotonic acid, mixtures thereof, and the like.

While the present invention may be used in the emulsion polymerization of any ethylenically unsaturated monomers, vinyl monomers containing acrylic monomers are preferred, since they are known to impart aqueous polymer emulsions with excellent mechanical properties and outstanding outdoor weathering resistance. Aqueous polymer emulsions made of acrylic monomers or acrylic monomers in combination with other vinyl monomers are recognized as the most important polymer emulsions for use in surface coating applications. Vinyl monomer mixtures containing at least about five percent by weight of acrylic monomer are preferred. A particularly preferred monomer mixture for use in the present invention is a mixture of n-butyl acrylate and vinyl acetate.

Any known method of emulsion polymerization may be used in this invention including semi-batch, staged adiabatic, full batch, and continuous processes. The monomers are generally polymerized at temperatures from 0° to 100° C.; preferably from 40° to 90°. in the presence of suitable polymerization initiators. Suitable polymerization initiators include: water-soluble peroxides capable of generating free radicals, for example, ammonium persulfate, sodium persulfate, potassium persulfate, hydrogen peroxide, t-butyl hydroperoxide, di-t-butyl peroxide, peracetice acid, perbenzoic acid, diacetyl peroxide, t-butyl peracetate, t-butyl penbenzoate, and the like. The amount of such free radical initiators used generally ranges from about 0.05 to 6.0 wt %. A redox initiator system may also be used, especially when polymerization is carried out at low temperature. For example, reducing agents may be used in addition to the peroxide initiators mentioned above. Typical reducing agents include: alkali metal salts of hydrosulfites, sulfoxylates, thiosulfates, sulfites, bisulfites and the like. In general, the reducing agents are used at levels from about 0.01 to about 6.0 wt %.

Surface active agents are also typically used to emulsify the aqueous polymer emulsions. Example of such surface active agents suitable for use in the present invention include: alkyl and/or aryl sulfates, sulfonates, or carboxylates such as sodium lauryl sulfate, sodium salt of alkyaryl polyether sulfates and the like; oxyalkylated fatty amines, fatty acid amides and/or monoalkylphenols such as oxyethylated lauryl alcohol, oxyethylated oleyl alcohol, oxyethylated stearyl alcohol, oxyethylated stearamide, oxyethylated oleylamide, oxyethylated p-iso-octylphenol, oxyethylated p-n-nonylphenol, oxyethylated p-iso-octylphenol, oxyethylated p-n-dodecylphenol, and the like. The surface active agents are generally in amounts of from 0 to 15 wt %, preferably from about 0.5 to 8.0 wt %, based on the weight of the monomers.

The following examples are provided to further illustrate the invention. The examples are intended to be illustrative in nature and are not to be construed as limiting the scope of the invention. All parts and percentages are reported by weight, unless specified otherwise.

COMPARATIVE EXAMPLE I

This example describes the preparation of an aqueous polymer emulsion without a protective colloid. A reaction kettle is equipped with an agitator, thermometer, reflux condenser, nitrogen inlet, water jacket, and suitable addition ports, The kettle is charged with 88.3 parts of deionized water, 3 parts of a polyalkylene glycol ether (TERGITOL XC supplied by Union Carbide Corp.), 2.88 parts of an ammonium salt of sulfated nonyl phenoxypoly (ethyleneoxy) ethanol (Alipal EP-110 supplied by GAF Chemicals Corp.) 0.375 part of sodium acetate, 0.075 part of potassium persulfate, 8 parts of vinyl acetate, and 2 parts of n-butyl acrylate. The kettle is heated gradually to 71 C. with continued agitation and nitrogen purge. A mixture of 72 parts of vinyl acetate and 18 parts of n-butyl acrylate was added to the reaction kettle over a 4 hour period. The temperature of the kettle was raised and maintained at 79° C. Twenty minutes later, 0.3 parts of potassium persulfate in 6.25 parts of deionized water was added to the kettle over a 3.7 hour period. The temperature of the kettle was maintained at 79° C. for 30 minutes more after the end of all additions. The latex was then cooled to room temperature.

The latex produced had the following properties:

| Latex | Total Solids (wt %) | pH | Particle Size (microns) (a) | Viscosity (cps) (b) |
|---|---|---|---|---|
| 1 | 52.0 | 4.9 | 0.15 | 220 |

(a) NICOMP Model 200 Laser Particle Sizer
(b) Brookfield Model LVT, No. 3 spindle, 60 rpm at 25° C.

The latex was marginally stable in the reaction kettle. Some coagulum was observed on the agitator. . When the latex was subjected to a mechanical stability test in a Waring blender at the highest speed, it coagulated in 15 seconds.

COMPARATIVE EXAMPLE II

This example describes the preparation of aqueous polymer emulsions stabilized with a conventional hydroxyethylcellulose protective colloid. The procedure and ingredients described in Example I were used, except that from 0.125 to 1.0 part of an additional hydroxyethylcellulose (CELLOSIZE QP-09L supplied by Union Carbide Corp.) initially was charged to the reaction kettle. The amount of hydroxyethylcellulose (HEC) employed and the properties of the latexes produced are shown below:

| Latex | Total Solids (wt %) | Amount HEC (parts) | pH | Particle Size (microns) | Viscosity (cps) |
|---|---|---|---|---|---|
| 2 | 52.3 | 1.0 | 4.9 | 0.39 | 720 |
| 3 | 52.1 | 0.5 | 4.8 | 0.25 | 780 |
| 4 | 52.0 | 0.25 | 4.8 | 0.24 | 650 |
| 5 | 52.2 | 0.125 | 4.8 | 0.18 | 420 |

The stability of the above latexes is reported below:

| Latex | Coagulum on Agitator | Mechanical Stability (a) |
|---|---|---|
| 2 | No | Excellent |
| 3 | Yes | Excellent |
| 4 | Yes | Coagulated after 10 minutes |
| 5 | Yes | Coagulated after 20 seconds |

(a) Waring blender at the highest speed for 10 minutes

The above results indicate that true stability of the latex can be obtained only when high amounts (1.0 part) of hydroxyethylcellulose is used. When lesser amounts of HEC is used, the latex either causes coagulum in the reaction kettle or coagulates in the mechanical stability test.

Example III

This example describes the preparation of aqueous polymer emulsions stabilized with hydrophobically modified hydroxyethylcellulose (HMHEC) as a protective colloid.

The procedure and ingredients described in Example I were used, except that an additional HMHEC (from 0.125 to 0.5 part) was charged to the reaction kettle initially. Th hydrophobically modified hydroxyethylcellulose used in this example was either straight chain alkyl modified hydroxyethylcellulose or aryl alkyl modified hydroxyethylcellulose. The amount and type of HMHEC employed and the properties of the latexes are shown below:

| Latex | Total Solids (wt %) | Amount HMHEC (parts) | pH | Particle Size (microns) | Viscosity (cps) |
|---|---|---|---|---|---|
| 6 | 52.6 | 0.5 (a) | 4.8 | 0.40 | 990 |
| 7 | 52.0 | 0.25 (a) | 4.8 | 0.73 | 760 |
| 8 | 52.0 | 0.125 (a) | 4.8 | 0.32 | 420 |
| 9 | 52.4 | 0.25 (b) | 4.8 | 0.43 | 720 |
| 10 | 52.5 | 0.125 (b) | 5.1 | 0.42 | 700 |
| 11 | 52.2 | 0.125 (c) | 5.0 | 0.51 | 490 |
| 12 | 51.9 | 0.125 (d) | 5.2 | 0.38 | 760 |
| 13 | 52.6 | 0.125 (e) | 5.2 | 0.28 | 570 |

(a) Alkyl modified HEC (Natrosol Plus 330 supplied by Hercules, Inc)
(b) Aryl alkyl modified HEC with a Brookfield LVT viscosity of 153 cps in a 1% aqueous solution.
(c) Aryl alkyl modified HEC with a Brookfield LVT viscosity of 131 cps in a 1% aqueous solution.
(d) Aryl alkyl modified HEC with a Brookfield LVT viscosity of 48 cps in a 1% aqueous solution.
(e) Aryl alkyl modified HEC with a Brookfield LVT viscosity of 39 cps in a 1% aqueous solution.

The stability of the above latexes is shown below:

| Latex | Coagulum on Agitator | Mechanical Stability (a) |
|---|---|---|
| 6 | No | Excellent |
| 7 | No | Excellent |
| 8 | No | Excellent |
| 9 | No | Excellent |
| 10 | No | Excellent |
| 11 | No | Excellent |
| 12 | No | Excellent |
| 13 | No | Excellent |
| 14 | No | Excellent |

(a) Waring blender at the highest speed for 10 minutes

The above results indicate the hydrophobically modified HEC render the latexes free of coagulum in the reaction kettle and impart the latexes with excellent mechanical stability against shearing force at very low use levels.

EXAMPLE IV

This example describes the utility of hydrophobically modified hydroxyethylcellulose for the preparation of aqueous polymer emulsions containing all acrylic monomers as illustrated by Latex 16 in the table below. Latexes 14 and 15 are comparative examples. The equipment described in Example I was used for these latexes.

Latex 14 comparatively demonstrates the preparation of an aqueous polymer emulsion containing all acrylic monomers without a protective colloid. A monomer preemulsion was prepared by mixing together 37.5 parts of deionized water, 4.63 parts of a nonylphenoxypoly (ethylenoxy) ethanol, (Igepal CO970 supplied by GAF Chemicals Corp.), 4.63 parts of an ammonium salt of sulfated nonylphenoxypoly (ethyleneoxy) ethanol (Alipal EP-110 supplied by GAF Chemicals Corp.), 50 parts of n-butyl acrylate, 48.5 parts of methylmethacrylate, and 1.5 parts of methacrylic acid. The reaction kettle was charged with 62.5 parts of deionized water and was heated to 65° C. with continued agitation and nitrogen purge. The monomer preemulsions along with 0.25 part of ammonium persulfate in 6.3 parts of deionized water, and 0.1 part of sodium formaldehyde sulfoxylate in 6.4 parts of deionized water in separate feed streams were added to the reaction kettle over a three hour period. The temperature was maintained at 65° C. throughout the addition. The polymer emulsion was then cooled to room temperature and was neutralized to pH 9-10 with ammonium hydroxide.

Latex 15 comparatively demonstrates the preparation of the same all acrylic polymer emulsion as Latex 14 except that an additional hydroxyethylcellulose was used as the protective colloid. The procedure and ingredients for Latex 14 were used for the preparation of Latex 15, except that the initial water charge was 39.9 parts instead of 62.5 parts. Additionally, after two hours of monomers preemulsion addition, a solution of 0.25 part of a hydroxyethylcellulose (CELLOSIZE QP-09L supplied by Union Carbide Corp.) in 22.3 parts of deionized water was added to the reaction kettle over a one hour period. The HEC solution addition was ended with monomer preemulsion. The temperature of the kettle was maintained at 65° C. for 30 more minutes after the end of all additions. The polymer emulsion was then cooled to room temperature and was neutralized to pH 9–10 with ammonium hydroxide.

Latex 16 describes the preparation of the same all acrylic polymer emulsion as Latex 15 except that a hydrophobically modified hydroxyethylcellulose was used to replace HEC as the protective colloid. The procedure and ingredients for the preparation of Latex 15 were used except that 0.25 part of a HMHEC (Natrosol Plus 330 supplied by Hercules, INC.) was used to replace a conventional HEC (CELLOSIZE QP-09L supplied by Union Carbide Corp.) The amount and types of protective colloid employed and the properties of the latexes are shown below:

| Latex | Total Solids (wt %) | Amount Protective Colloid (parts) | pH | Particle Size (microns) | Viscosity (cps) |
|---|---|---|---|---|---|
| 14 | 48.2 | None | 9.2 | 0.18 | 46 |
| 15 | 47.9 | 0.25 (a) | 9.3 | 0.32 | 214 |
| 16 | 48.0 | 0.25 (b) | 9.7 | 0.37 | 794 |

(a) Conventional HEC (CELLOSIZE QP-09L supplied by Union Carbide Corp.)
(b) Alkyl modified HEC (Natrosol Plus 330 supplied by Hercules, Inc.)

Generally, it is advantageous to delay the addition of HMHEC or HEC to prepare stable all-acrylic aqueous polymer emulsions. The addition of HMHEC or HEC can even be extended after the end of monomer preemulsion feed. Extensive reaction between HMHEC or HEC with acrylic monomers thickens or coagulates all-acrylic polymer emulsions when HMHEC or HEC is added to the reaction kettle initially. The stability of the above latexes are shown below:

| Latex | Coagulum or Agitator | Mechanical Stability (a) |
|---|---|---|
| 14 | No | Coagulated after 10 min. |
| 15 | No | Thickened |
| 16 | No | Excellent |

(a) Waring blender at the highest speed for 10 minutes

The above results indicate the hydrophobically modified HEC imparts all acrylic polymer emulsions with better mechanical stability. Additionally, HMHEC imparts all acrylic polymer emulsion with excellent rheological property which is reflected in high viscosity of the resulting polymer emulsion. This kind of rheological property is desirable in trade paint latex since it translates into high film build for the paint.

The embodiments of the invention in which an exclusive property or privilege is claimed are defined as follows:

1. In a process for the emulsion polymerization of ethylenically unsaturated monomers containing acrylic monomers in the presence of a polymerization catalyst, the improvement comprising conducting the emulsion polymerization in the presence of from about 0.02 to about 2.0 percent by weight of the total monomer content, of a hydrophobically modified hydroxyethylcellulose.

2. The process of claim 1 wherein the hydrophobically modified hydroxyethylcellulose is selected from alkyl modified hydroxyethylcellulose and aryl alkyl modified hydroxyethylcellulose.

3. The process of claim 1 wherein the ethylenically unsaturated monomers are selected from acrylic monomers, and mixtures of acrylic monomers and other vinyl monomers.

4. The process of claim 1 wherein the hydrophobically modified hydroxyethylcellulose is present in an amount from about 0.05 to about 1.0 percent.

5. The process of claim 1 wherein the emulsion polymerization is conducted in the presence of a water soluble free radical initiator.

6. The process of claim 5 wherein the emulsion polymerization is conducted in the presence of a water soluble free radical initiator in combination with a reducing agent.

7. The process of claim 2 wherein the hydrophobically modified hydroxyethylcellulose is a hydroxyethylcellulose grafted with about 0.1 to about 2.0 weight percent of a hydrocarbon group having from about 8 to about 25 carbon atoms.

8. The process claim 2 wherein the hydrophobically modified hydroxyethylcellulose is a hydroxyethylcellulose modified with an aryl alkyl group having an alkyl group with about 1 to 25 carbon atoms attached to a benzene or naphthalene ring, wherein the degree of substitution of the aryl alkyl group is from about 0.01 to about 0.25.

9. The process of claim 3 wherein the ethylenically unsaturated monomers are selected from acrylic acid, methacrylic acid, n-butyl acrylate, isobutyl acrylate, ethyl acrylate, methyl acrylate, 2ethyl hexyl acrylate, oleyl acrylate, dodecyl acrylate, stearyl acrylate, methylmethacrylate, ethyl methacrylate, n-butyl methacrylate, and mixtures thereof.

10. The process of claim 9 wherein the ethylenically unsaturated monomers are a mixture of n-butyl acrylate and vinyl acetate.

* * * * *

REEXAMINATION CERTIFICATE (1522nd)

United States Patent [19]

Lo

[11] B1 4,845,175

[45] Certificate Issued  Jul. 30, 1991

[54] PREPARATION OF AQUEOUS POLYMER EMULSIONS IN THE PRESENCE OF HYDROPHOBICALLY MODIFIED HYDROXYETHYLCELLULOSE

[75] Inventor: Chia-Chen Lo, Raleigh, N.C.

[73] Assignee: Union Carbide Corporation, Danbury, Conn.

Reexamination Request:
No. 90/001,931, Feb. 1, 1990

Reexamination Certificate for:
Patent No.: 4,845,175
Issued: Jul. 4, 1989
Appl. No.: 172,432
Filed: Mar. 24, 1988

[51] Int. Cl.$^5$ .......................... C08F 2/00; C08F 2/30; C08F 120/18
[52] U.S. Cl. .................... 526/200; 526/329.7
[58] Field of Search .................... 526/200, 329.7

[56] References Cited

U.S. PATENT DOCUMENTS

| | | | |
|---|---|---|---|
| 3,513,120 | 6/1970 | Pohlemann et al. | 260/29.6 |
| 4,228,277 | 10/1980 | Landoll | 536/90 |
| 4,265,796 | 5/1981 | Mueller-Mall et al. | 260/29.6 R |
| 4,352,916 | 10/1982 | Landoll | 526/200 |
| 4,684,704 | 8/1987 | Craig | 526/200 |
| 4,845,175 | 4/1989 | Lo | 526/200 |

FOREIGN PATENT DOCUMENTS 1155275  6/1969  United Kingdom.

OTHER PUBLICATIONS

Journal of Paint Technology—Reprint—"Some Recent Developments in Water-Based Systems", vol. 41, No. 557, Oct. 1961; Levine et al.

P.M.S.E. 54, 354 (1986) "Polymeric Surfactants Based on Hydroxyethyl Cellulose as Stabilizers in Emulsion Polymerization"; Craig.

P.M.S.E. 52, 104 (1985) "The Effect of Molecular Weight on the Grafting Reactions of Hydroxyethyl Cellulose During the Emulsion Polymerization of Vinyl Monomers"; Craig.

*Primary Examiner*—Kriellion S. Morgan

[57] ABSTRACT

Disclosed is an improved process for the emulsion polymerization of ethylenically unsaturated monomers in the presence of a polymerization *catalyst wherein the emulsion polymerization* is conducted in the presence of from about 0.02 to about 2.0 percent by weight of the total monomer content, of a hydrophobically modified hydroxyethylcellulose.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 7–23:

In water-soluble polymers modified with hydrophobic groups, the hydrophobic groups associated with each other in the aqueous phase. A network is formed due to this kind of association and renders these polymers as efficient thickeners for aqueous paint systems. The hydrophilic backbone and hydrophobic side groups also make the polymers exhibit surface activity. These hydrophobically modified water-soluble polymers are categorized as [associated] *associative* thickeners. A number of associative thickeners are available commercially. For example, hhydroxyethylcellulose has been modified with open chain alkyl groups and is used as an associative thickener as described in U.S. Pat. No. 4,228,227. This reference describes an open chain $C_{10}$ to $C_{24}$ alkyl epoxide, in an amount between 0.2 to 1%, reacted with hydroxyethylcellulose to prepare a hydrophobically modified hydroxyethylcellulose.

Column 3, lines 29–53:

Vinyl monomers which have low reactivity toward hydroxyethylcellulose, or monomers which have low protective colloid-grafting potential, also are suitable for the present invention. Such monomers include: vinyl esters, for example vinyl acetate, vinyl propionate, vinyl formate, vinyl n-butyrate, vinyl laurate, vinyl versatate, vinyl stearate, vinyl [privalate] *pivalate*, and the like; vinyl ethers, for example, methylvinyl ether, ethylvinyl ether, and butylvinyl ether; allyl monomers, for example allyl acetate, allyl propionate, allyl lactate, allyl amines, and the like; olefins, such as ethylene, propylene, 1-butene, 1-pentene, 1-hexene, and the like.

Other vinyl monomers suitable for this invention include: acrylonitrile, styrene, p-methyl styrene, vinyl and vinylidene halides such as vinyl chloride and vinylidene chloride, sodium vinyl sulfonate, acrylamide, methacrylamide, sodium 2-acrylamide-2-methyl-propane sulfonate (AMPS®), diacetone acrylamide, N-methylol acrylamide, N-methylol methacrylamide, maleic acid, [fumeric] *fumaric* acid, itaconic acid, dimethyl maleate, di-n-butyl maleate, diethyl maleate, diethylhexyl maleate, diethyl fumarate, butadiene, chloroprene, isoprene, 1,4-butanediol dimethacrylate, diallyl maleate, divinyl adipate, pentaerythritol triacrylate, crotonic acid, mixtures thereof, and the like.

Column 4, lines 1–22:

Any known method of emulsion polymerization may be used in this invention including semi-batch, staged adiabatic, full batch, and continuous processes. The monomers are generally polymerized at temperatures from 0° to 100° C.; preferably from 40° to 90° C. in the presence of suitable polymerization initiators. Suitable polymerization initiators include: water-soluble peroxides capable of generating free radicals, for example, ammonium persulfate, sodium persulfate, potassium persulfate, hydrogen peroxide, t-butyl hydroperoxide, di-t-butyl peroxide, [peracetice] *peracetic* acid, perbenzoic acid, diacetyl peroxide, t-butyl peracetate, t-butyl [penbenzoate] *perbenzoate*, and the like. The amount of such free radical initiators used generally ranges from about 0.05 to 6.0 wt %. A redox initiator system may also be used, especially when polymerization is carried out at low temperature. For example, reducing agents may be used in addition to the peroxide initiators mentioned above. Typical reducing agents include: alkali metal salts of hydrosulfites, sulfoxylates, thiosulfates, sulfites, bisulfites and the like. In general, the reducing agents are used at levels from about 0.01 to about 6.0 wt %.

Column 4, line 48–Column 5, line 2:

This example describes the preparation of an aqueous polymer emulsion without a protective colloid. A reaction kettle is equipped with an agitator, thermometer, reflux condenser, nitrogen inlet, water jacket, and suitable addition [ports,] *ports*. The kettle is charged with 88.3 parts of deionized water, 3 parts of a polyalkylene glycol ether (TERGITOL [XC] *XD* supplied by Union Carbide Corp.), 2.88 parts of an ammonium salt of sulfated nonyl [phenoxypoly (ethyleneoxy)] *phenoxypoly(ethyleneoxy)* ethanol (Alipal EP-110 supplied by GAF Chemicals Corp.) 0.375 part of sodium acetate, 0.075 part of potassium persulfate, 8 parts of vinyl acetate, and 2 parts of n-butyl acrylate. The kettle is heated gradually to 71° C. with continued agitation and nitrogen purge. A mixture of 72 parts of vinyl acetate and 18 parts of n-butyl acrylate was added to the reaction kettle over a 4 hour period. The temperature of the kettle was raised and maintained at 79° C. Twenty minutes later, 0.3 parts of potassium persulfate in 6.25 parts of deionized water was added to the kettle over a 3.7 hour period. The temperature of the kettle was maintained at 79° C. for 30 minutes more after the end of all additions. The latex was then cooled to room temperature.

Column 5, lines 60–68:

The procedure and ingredients described in Example I were used, except that an additional HMHEC (from 0.125 to 0.5 part) was charged to the reaction kettle initially. [Th] *The* hydrophobically modified hydroxyethylcellulose used in this example was either straight chain alkyl modified hydroxyethylcellulose or aryl alkyl modified hydroxyethylcellulose. The amount and type of HMHEC employed and the properties of the latexes are showh below:

Column 6, lines 21–30:

| Latex | Coagulum on Agitator | Mechanical Stability (a) |
|---|---|---|
| 6 | No | Excellent |
| 7 | No | Excellent |
| 8 | No | Excellent |
| 9 | No | Excellent |
| 10 | No | Excellent |
| 11 | No | Excellent |
| 12 | No | Excellent |
| 13 | No | Excellent |
| [14 | No | Excellent] |

AS A RESULT OF REEXAMINATION, IT HAS BEEN DETERMINED THAT:

Claim 6 is cancelled.

Claim 1 is determined to be patentable as amended.

Claims 2-5 and 7-10, dependent on an amended claim, are determined to be patentable.

New claims 11-20 are added and determined to be patentable.

1. In a process for the emulsion polymerization of ethylenically unsaturated monomers containing acrylic monomers in the presence of a polymerization catalyst, the improvement comprising:
   (i) adding a portion of the polymerization catalyst and a portion of the monomer after polymerization is commenced; and (ii) conducting the emulsion polymerization in the presence of from about 0.02 to [about2.0] *about 2.0* percent by weight of the total monomer content, of a hydrophobically modified hydroxyethylcellulose, *whereby there is produced a stable emulsion with an average particle size below one micron.*

11. The process of claim 3 wherein the monomers polymerized include mixtures of acrylic monomer and vinyl monomer.

12. The process of claim 3 wherein the monomers polymerized consist essentially of acrylic monomers.

13. The process of claim 1 wherein at least about 90% of the monomer is added during the course of the polymerization.

14. The process of claim 13 wherein at least about 80% of the catalyst is added concurrently with the monomer.

15. The process of claim 1 wherein the emulsion polymerization is conducted in the presence of an anionic surface active agent and a nonionic surface active agent, in the weight ratio of about 0.3:1.

16. The process of claim 1 wherein the total solids of the polymer emulsion is about 52%.

17. In a process for the emulsion polymerization of ethylenically unsaturated monomers consisting essentially of acrylic monomers in the presence of a polymerization catalyst, the improvement comprising: (i) conducting the polymerization in the presence of from about 0.02 to about 2.0 percent by weight of the total monomer content of a hydrophobically modified hydroxyethylcellulose; (ii) adding said hydrophobically modified hydroxyethylcellulose after polymerization is commenced; and (iii) adding a portion of the polymerization catalyst and a portion of the monomer after polymerization is commenced; whereby there is produced a stable emulsion with an average particle size below one micron.

18. The process of claim 17 wherein the hydrophobically modified hydroxyethylcellulose and monomer are added concurrently during the course of the polymerization.

19. The process of claim 17 wherein at least some of the hydrophobically modified hydroxyethylcellulose is added after all of the monomer has been added.

20. In a process for the emulsion polymerization of ethylenically unsaturated monomers containing acrylic monomers in the presence of a polymerization catalyst, the improvement comprising conducting the emulsion polymerization in the presence of from about 0.02 to about 2.0 percent by weight of the total monomer content, of a hydrophobically modified hydroxyethylcellulose which is a hydroxyethylcellulose modified with an aryl alkyl group having an alkyl group with about 1 to 25 carbon atoms attached to a benzene or naphthalene ring, wherein the degree of substitution of the aryl alkyl group is from about 0.01 to about 0.25.

* * * * *